(12) United States Patent
Carmen et al.

(10) Patent No.: US 11,788,437 B2
(45) Date of Patent: Oct. 17, 2023

(54) RADIAL ENGINE-GENERATOR WITH OVERHEAD CAMSHAFT

(71) Applicant: UniGen Power Inc., Auburn Hills, MI (US)

(72) Inventors: Anthony Joseph Carmen, Bloomfield Hills, MI (US); Nitesh Dindorkar, Lake Orion, MI (US)

(73) Assignee: UniGen Power Inc., Auburn Hills, MI (US)

( * ) Notice: Subject to any disclaimer, the term of this patent is extended or adjusted under 35 U.S.C. 154(b) by 0 days.

(21) Appl. No.: 17/851,803

(22) Filed: Jun. 28, 2022

(65) Prior Publication Data

US 2022/0412231 A1 Dec. 29, 2022

Related U.S. Application Data

(60) Provisional application No. 63/215,548, filed on Jun. 28, 2021.

(51) Int. Cl.
*F01L 1/02* (2006.01)
*F01L 1/053* (2006.01)
(Continued)

(52) U.S. Cl.
CPC .............. *F01L 1/026* (2013.01); *F01B 1/062* (2013.01); *F01L 1/022* (2013.01); *F01L 1/053* (2013.01);
(Continued)

(58) Field of Classification Search
CPC ... F01L 1/022; F01L 1/026; F01L 2001/0476; F01L 1/053; F01L 1/181; F01L 2250/02;
(Continued)

(56) References Cited

U.S. PATENT DOCUMENTS

| 3,800,751 A | 4/1974 | Glassey et al. |
| 5,979,392 A | 11/1999 | Moorman et al. |

(Continued)

FOREIGN PATENT DOCUMENTS

DE 20001974 U1 3/2000

OTHER PUBLICATIONS

International Search Report and Written Opinion for International Application No. PCT/US22/35294 dated Nov. 4, 2022 (14 pages).

(Continued)

*Primary Examiner* — Jorge L Leon, Jr.
(74) *Attorney, Agent, or Firm* — Reising Ethington P.C.

(57) ABSTRACT

A radial engine-generator includes an electric power generator and a radial engine. The radial engine-generator can be a mobile and portable unit, and is employable as a primary or back-up source of electric power at data centers, manufacturing facilities, electric vehicle charging stations, medical facilities, telecommunications, and residential neighborhoods, among many other applications. The electric power generator and radial engine are coupled together. The radial engine includes, among other components, multiple cylinders, multiple cylinder heads, and multiple overhead camshaft assemblies. The overhead camshaft assemblies are located at the cylinder heads and each include one or more camshafts. The camshaft(s) receive rotational drive input from a crankshaft of the radial engine. In certain implementations, camshaft carrier assemblies can be provided to support components of the overhead camshaft assemblies.

17 Claims, 14 Drawing Sheets

(51) Int. Cl.
*H02K 7/18* (2006.01)
*F02B 75/22* (2006.01)
*F01B 1/06* (2006.01)
*F02B 63/04* (2006.01)
*F01L 1/047* (2006.01)
*F01P 3/02* (2006.01)
*F01L 1/18* (2006.01)

(52) U.S. Cl.
CPC ............ *F02B 63/04* (2013.01); *F02B 75/222* (2013.01); *H02K 7/1815* (2013.01); *F01L 1/181* (2013.01); *F01L 2001/0476* (2013.01); *F01L 2001/0535* (2013.01); *F01L 2250/02* (2013.01); *F01L 2250/06* (2013.01); *F01P 2003/021* (2013.01)

(58) Field of Classification Search
CPC . F01L 2250/06; F01P 2003/021; F01B 1/062; F02B 63/04; F02B 75/222; H02K 7/1815
USPC ..................... 123/41.44, 90.27, 90.31, 90.44
See application file for complete search history.

(56) References Cited

U.S. PATENT DOCUMENTS

| | | | |
|---|---|---|---|
| 10,480,388 | B2 | 11/2019 | Carmen, Jr. et al. |
| 2010/0072757 | A1* | 3/2010 | Kealy .................. F02B 37/001 290/1 A |
| 2012/0240892 | A1 | 9/2012 | Carmen et al. |
| 2014/0048253 | A1 | 2/2014 | Andreychuk |
| 2018/0066565 | A1 | 3/2018 | Carmen, Jr. et al. |
| 2019/0277220 | A1* | 9/2019 | Horigome ............. B22D 19/08 |
| 2020/0308967 | A1 | 10/2020 | Zampieri |

OTHER PUBLICATIONS

Five cylinder overhead cam radial engine. Part Eleven (Brian Hogger), Sep. 27, 2017, online, retrieved from <UROL:https://www.youtube.com/watch?v=1pDFaLX2JBw> (23 pages).

'Building the five cylinder radial No. 10' (Brian Hogger), Mar. 18, 2017, [online], retrieved from <URL: https://www.youtube.com/watch?v=CHv2rmRoNlo> (29 pages).

* cited by examiner

RADIAL ENGINE-GENERATOR WITH OVERHEAD CAMSHAFT

CROSS-REFERENCE TO RELATED APPLICATION

This application claims the benefit of U.S. Provisional Patent.. Application No. 63/215,548, with a filing date of Jun. 28, 2021, the contents of which are hereby incorporated by reference in their entirety.

INTRODUCTION

The present disclosure generally relates to engine-generators and, more particularly, to engine-generators that employ internal combustion engines of a radial reciprocating type.

In general, an engine-generator—also referred to as a genset—combines an electric power generator and an engine together as a single piece of equipment. Engine-generators can be equipped as mobile and portable units that can be transported to their place of use via trailer or helicopter, for instance. Applications of use include as a source of primary electric power or back-up electric power at data centers, manufacturing facilities, electric vehicle charging stations, medical facilities, telecommunications, and residential neighborhoods, among many others. Furthermore, certain engine-generators employ radial engines. Radial engines are a type of internal combustion engine in which pistons and cylinders of the radial engines radiate outwardly from a centrally-located crankshaft in a circumferential arrangement.

SUMMARY

In an embodiment, a radial engine-generator may include an electric power generator and a radial engine. The radial engine is coupled to the electric power generator. The radial engine may include multiple cylinders, multiple cylinder heads, multiple camshaft carrier assemblies, and multiple overhead camshaft assemblies. The cylinder heads are situated outboard of the cylinders. The camshaft carrier assemblies are mounted on the cylinder heads. The overhead camshaft assemblies are carried by the camshaft carrier assemblies. Each of the overhead camshaft assemblies includes one or more camshafts. The camshaft(s) receives rotational drive input from a crankshaft of the radial engine.

In an embodiment, a radial engine-generator may include an electric power generator and a radial engine. The radial engine is coupled to the electric power generator. The radial engine may include multiple cylinders, multiple cylinder heads, multiple overhead camshaft assemblies, and multiple camshaft carrier assemblies. The cylinder heads are situated outboard of the cylinders. Each of the overhead camshaft assemblies includes one or more camshafts. The camshaft(s) receives rotational drive input from a crankshaft of the radial engine. Each of the overhead camshaft assemblies may include a camshaft sprocket. A gearset assembly drives rotation of the camshaft sprocket by way of one or more timing drive chains. The gearset assembly may include a crankshaft gear, a drive gear, a first working gear, and a sprocket. The crankshaft gear drives rotation of the drive gear. The drive gear, the first working gear, and the sprocket are mounted on a main shaft. The drive gear, the first working gear, and the sprocket rotate with the main shaft upon rotation of the main shaft. The sprocket drives movement of the timing drive chain(s). The camshaft carrier assemblies are mounted on the cylinder heads. Each of the camshaft carrier assemblies carries the camshaft(s), and each of the camshaft carrier assemblies carries an intake rocker arm and an exhaust rocker arm at each of the overhead camshaft assemblies.

In an embodiment, a radial engine-generator may include an electric power generator and a radial engine. The radial engine is coupled to the electric power generator. The radial engine may include multiple cylinders, multiple coolant fluid passages, multiple cylinder heads, multiple overhead camshaft assemblies, and multiple camshaft carrier assemblies. Each of the coolant fluid passages partially or more encircles each of the cylinders. The cylinder heads are situated outboard of the cylinders. Each of the overhead camshaft assemblies includes one or more camshafts. The camshaft(s) receives rotational drive input from a crankshaft of the radial engine. Each of the overhead camshaft assemblies may include a camshaft sprocket. A gearset assembly drives rotation of the camshaft sprocket by way of one or more timing drive chains. The gearset assembly may include a crankshaft gear, a drive gear, a first working gear, and a sprocket. The crankshaft gear drives rotation of the drive gear. The drive gear, the first working gear, and the sprocket are mounted on a main shaft. The drive gear, the first working gear, and the sprocket rotate with the main shaft upon rotation of the main shaft. The sprocket drives movement of the timing drive chain(s). The gearset assembly may further include a second working gear. The second working gear is driven to rotate by the first working gear. The second working gear drives rotation of other gears for transferring rotational drive input to other overhead camshaft assemblies. The camshaft carrier assemblies are mounted on the cylinder heads. Each of the camshaft carrier assemblies carries the camshaft(s), and each of the camshaft carrier assemblies carries an intake rocker arm and an exhaust rocker arm at each of the overhead camshaft assemblies.

BRIEF DESCRIPTION OF THE DRAWINGS

One or more aspects of the disclosure will hereinafter be described in conjunction with the appended drawings, wherein like designations denote like elements, and wherein.

DETAILED DESCRIPTION

Figure 1:
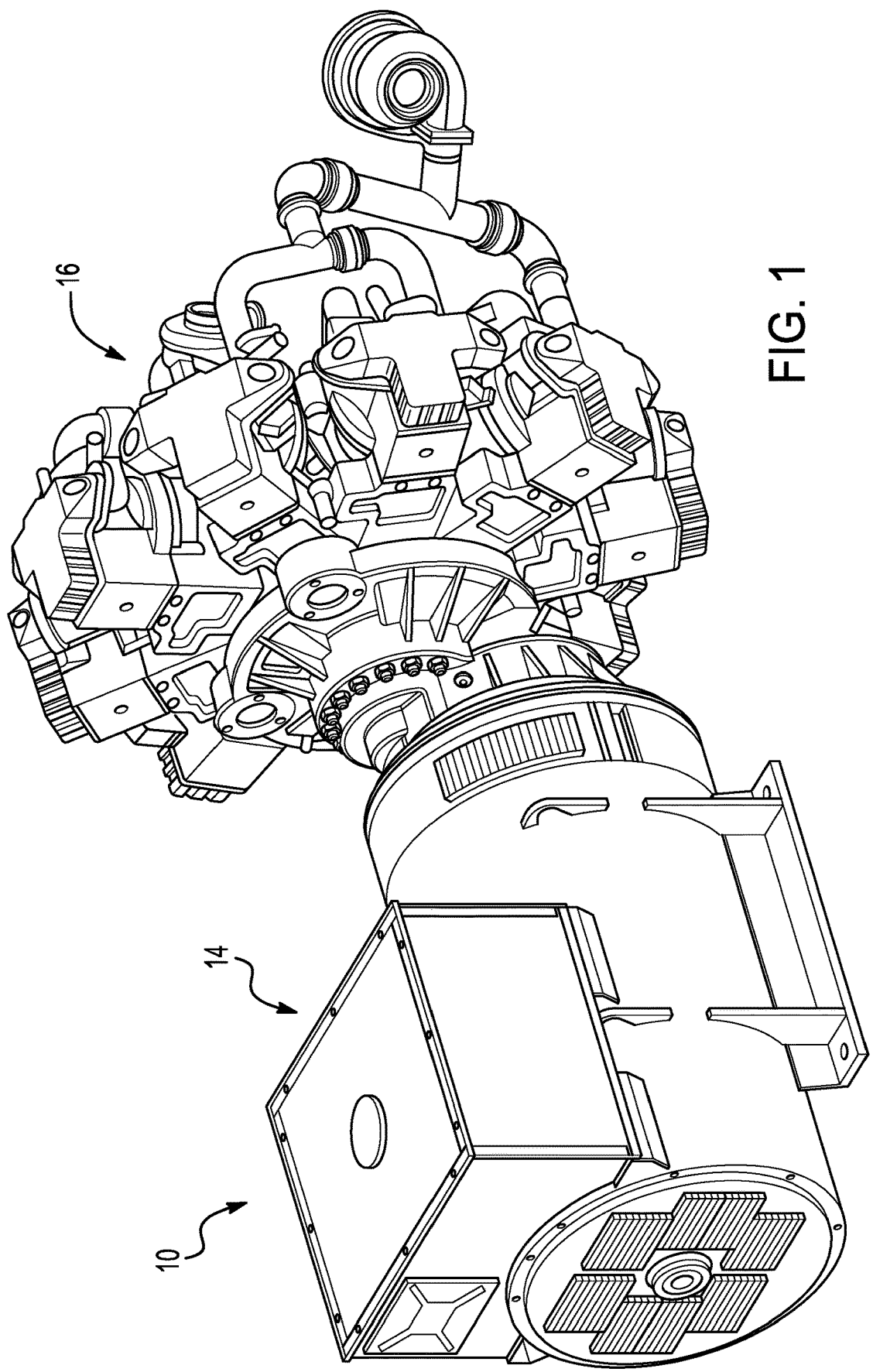
FIG. 1 is a perspective view of an embodiment of a radial engine-generator.
Figure 2:
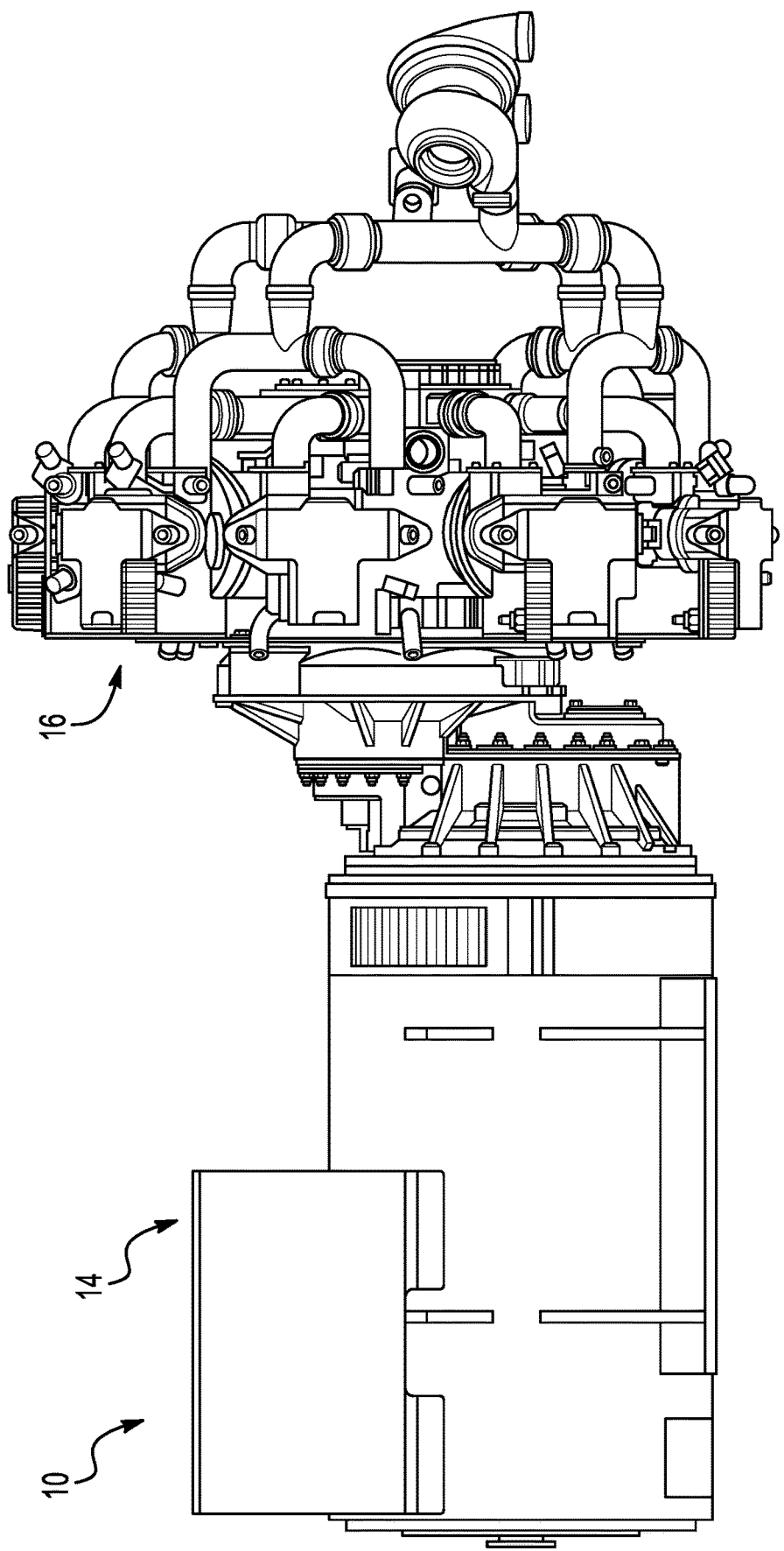
FIG. 2 is a side view of the radial engine-generator.
Figure 3:
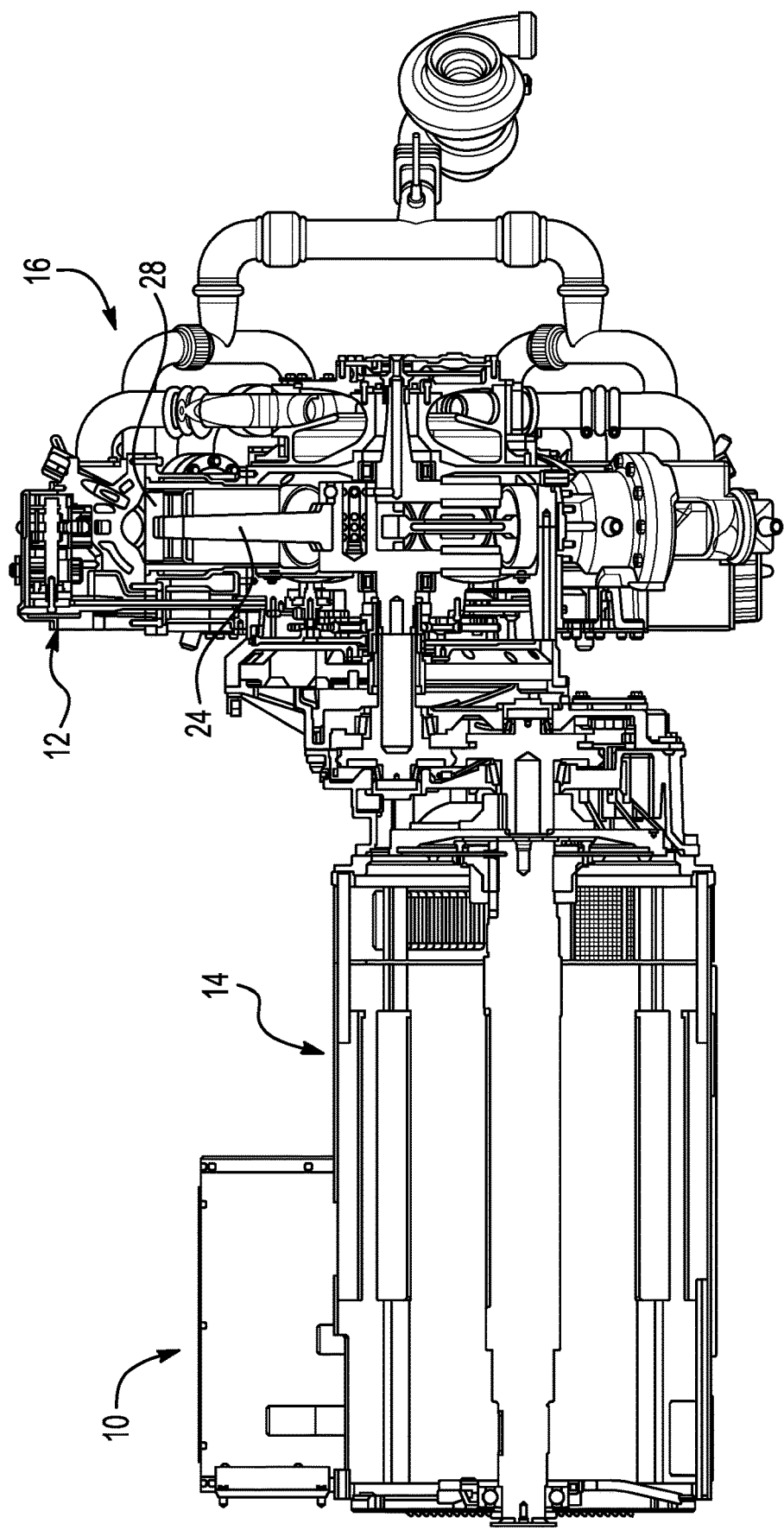
FIG. 3 is a cross-sectional view of the radial engine-generator.
Figure 4:
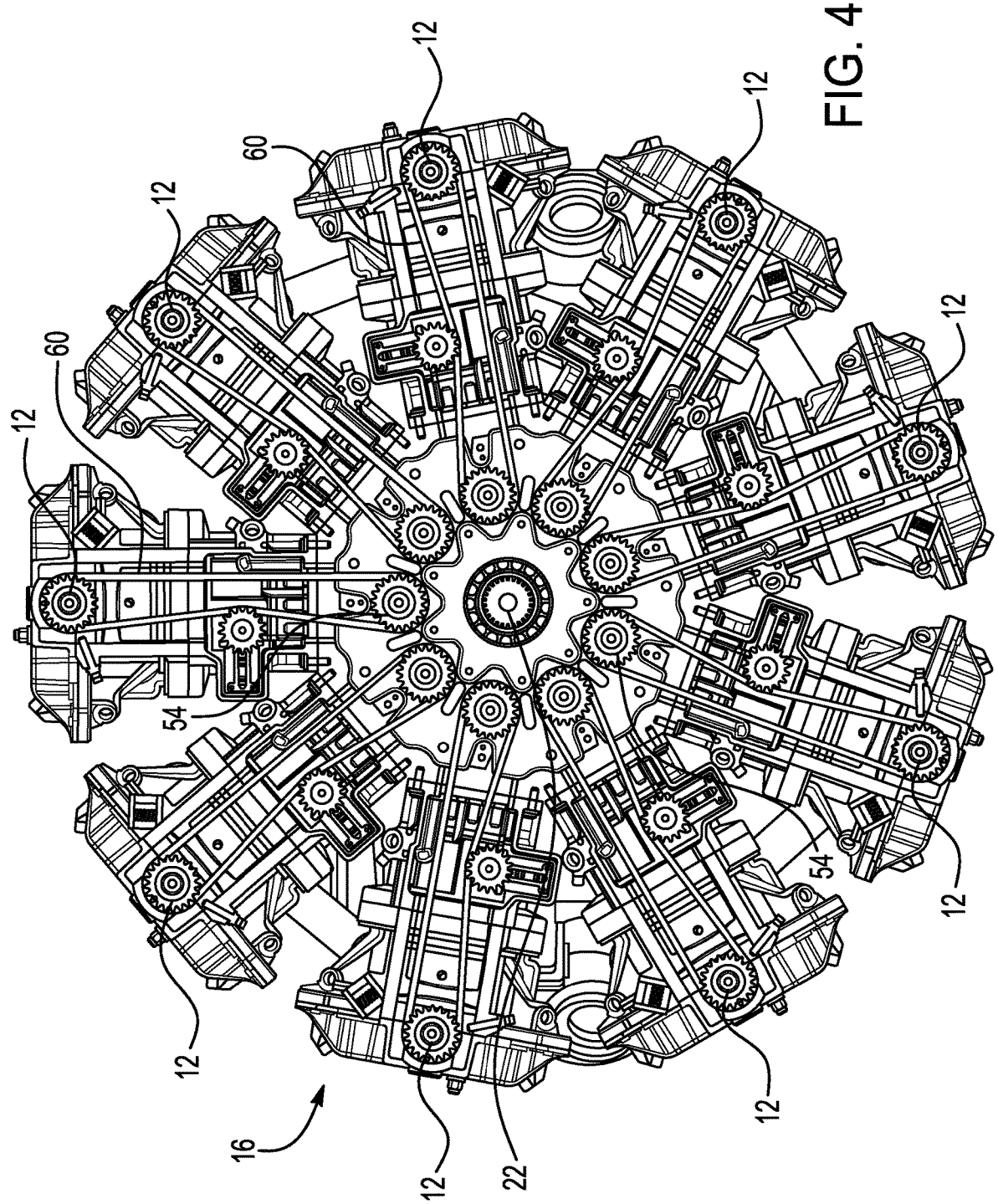
FIG. 4 is a front view of an embodiment of overhead camshaft assemblies that can be equipped with a radial engine of the radial engine-generator.
Figure 5:
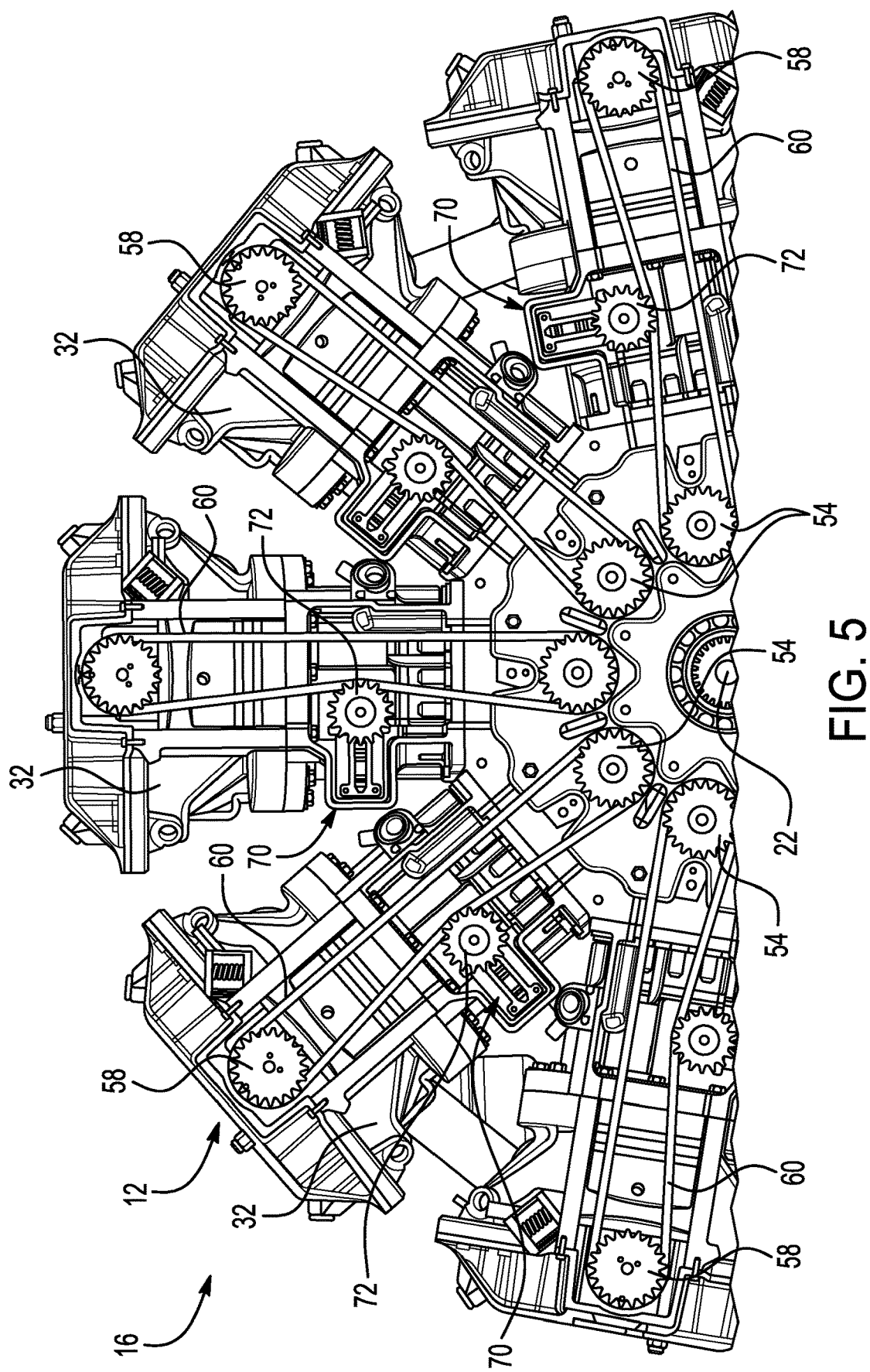
FIG. 5 is an enlarged view of the overhead camshaft assemblies.

Referring to the drawings, an embodiment of a radial engine-generator 10 is presented in the figures and detailed in this description. The radial engine-generator 10 is of the radial internal combustion engine type, and can be employed in use as a source of primary electric power or back-up electric power at data centers, manufacturing facilities, electric vehicle charging stations, medical facilities, telecommunications, and residential neighborhoods, among many other potential applications. The radial engine-generator 10 can utilize natural gas for combustion, for instance, or some other kind of gaseous and/or combustible fuel such as propane, methane, butane, gasoline, ethanol, alcohol, or the like, and can produce up to 1,000,000 Watts (W) of electricity in an embodiment with a single radial engine. In an embodiment with a multitude of radial engines, the radial engine-generator 10 can produce up to 3,500,000 W of electricity. The radial engine-generator 10 could be a diesel engine in other examples. The radial engine-generator 10 is relatively lightweight and compact, and is suitable for use as a mobile and portable unit that can be transported via trailer or helicopter, as examples. Unlike past engine-generators of the radial reciprocating type, the radial engine-generator 10 is equipped with overhead camshaft assemblies 12 for initiating actuation of intake and exhaust valves. The radial engine-generator 10 exhibits enhanced effectiveness and efficiency compared to the past engine-generators of the radial reciprocating type.

The radial engine-generator 10 can have various designs, constructions, and components in different embodiments depending upon—among other possible factors—the desired electric power output produced amid use. In an embodiment of FIGS. 1-14, for example, the radial engine-generator 10 has, as its larger primary components, an electric power generator 14 and a radial engine 16. The electric power generator 14 and radial engine 16 have a coupling between them for converting motive power of the radial engine 16 into electrical power at the electric power generator 14. The coupling transfers rotational output of the radial engine 16 to the electric power generator 14, such as to an internal armature of the electric power generator 14. A torque-transmission unit can be situated between the electric power generator 14 and the radial engine 16. One example of a generator unit that can be employed as the electric power generator 14 in the radial engine-generator 10, according to an embodiment, is model MJB-400-MB4 provided by Marelli Motori of Arzignano (VI), Italy; still, other examples of generator units are possible in other embodiments.

The radial engine 16 has nine pistons 18 and nine accompanying cylinders 20 that are configured to span radially-outwardly from a centrally-located crankshaft 22; still, other embodiments could have other quantities of pistons and cylinders. Piston rods 24 are connected to the crankshaft 22 and, upon combustion at the cylinders 20, work to drive rotation of the crankshaft 22. The crankshaft 22 extends from the radial engine 16 to the electric power generator 14. A crankshaft gear 23 is mounted on the crankshaft 22 and is driven to rotate thereby. Piston heads 28 reciprocate within the cylinders 20 and at combustion chambers 30. Cylinder heads 32 are situated radially-outboard of the cylinders 20. The cylinder heads 32 assist in the establishment of the combustion chambers 30. With particular reference to FIGS. 7, 10, 12, and 14, fluid coolant passages 34 are established within the cylinder heads 32 for coolant flow (e.g., water, water glycol mixture) at the cylinder heads 32 and thermal management of the radial engine 16. Coolant is introduced into the fluid coolant passages 34 via a coolant inlet 36, and coolant exits the fluid coolant passages 34 via a coolant outlet 38. An external coolant pump can be equipped with the radial engine-generator 10 to provide movement of the coolant, according to some embodiments. Immediately downstream of the coolant inlet 36, a section of the fluid coolant passages 34 circumferentially encircles an upper region of a first cylinder wall 39 of the cylinder 20. Here, a second cylinder wall 41 helps establish the fluid coolant passage 34 for the encircling. The second cylinder wall 41 is radially-outboard of said first cylinder wall 39, and hence constitutes an outer wall relative thereto. The first and second cylinder walls 39, 41 establish a double-wall construction with the fluid coolant passage 34 defined therebetween. An individual fluid coolant passage 34 exhibits an axial overlapping relationship with an individual cylinder 20. This section of the fluid coolant passages 34 helps ensure that the upper region of the first cylinder wall 39 is subject to coolant flow and hence benefits from the attendant heat reductions.

Figure 10:
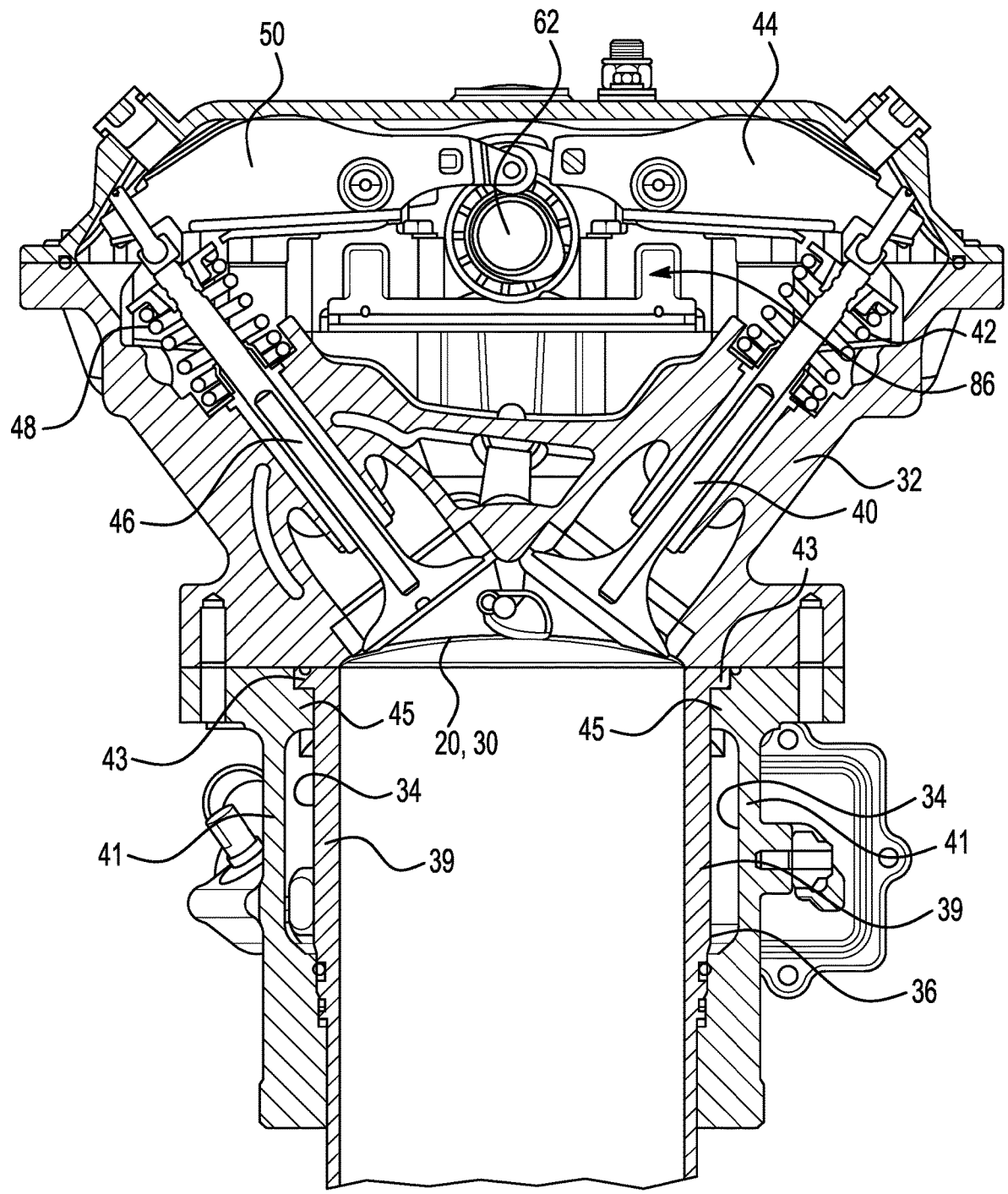
FIG. 10 is an enlarged sectional view of a cylinder head of the radial engine.
Figure 14:
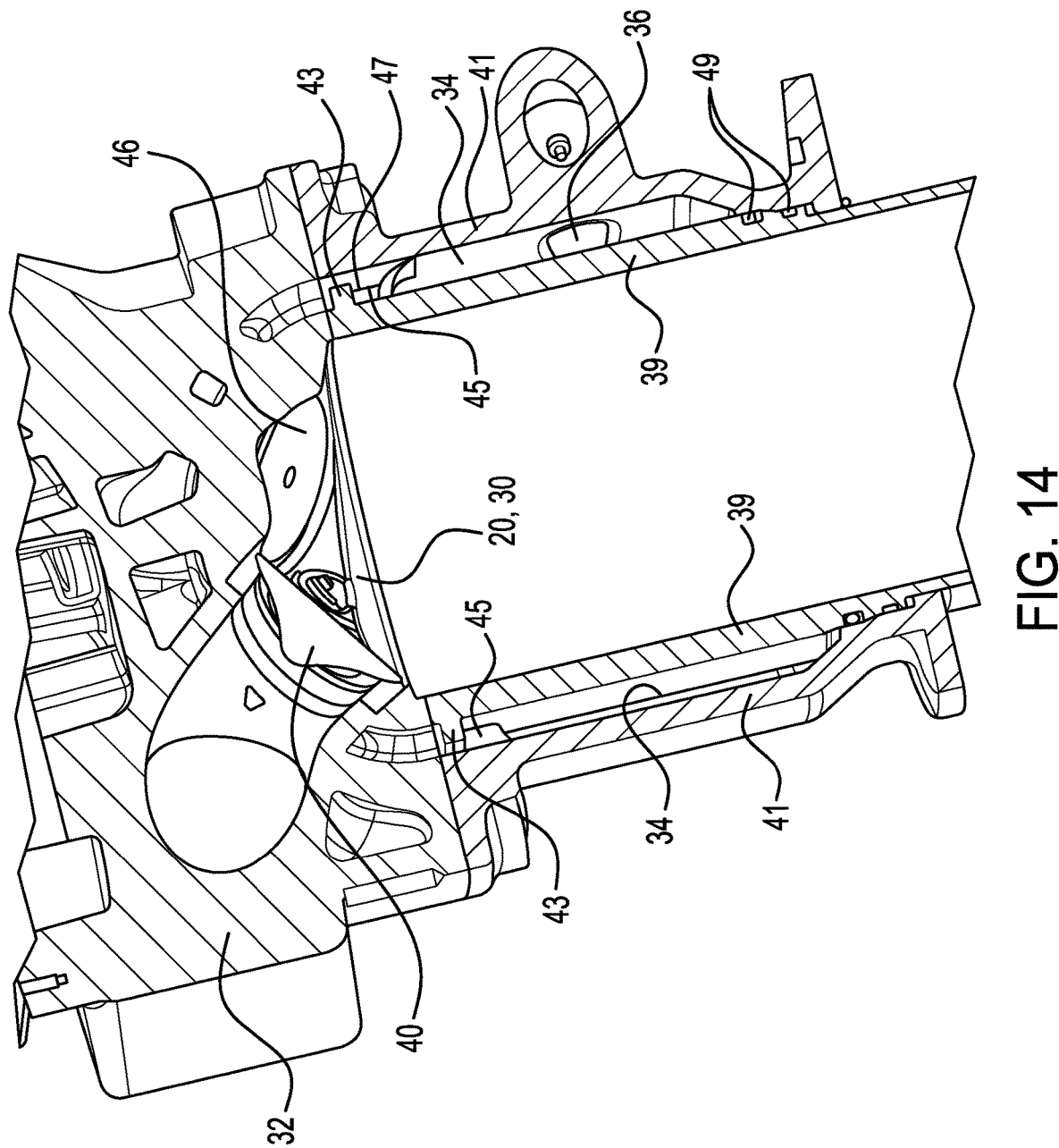
FIG. 14 is another sectional view of the cylinder head of the radial engine.

With reference now to FIGS. 10 and 14, in order to facilitate mounting and seating at the first cylinder wall 39 and second cylinder wall 41, as well as to facilitate and permit coolant flow thereat, a first set of protrusions 43 extends from the first cylinder wall 39 and a somewhat complementary second set of protrusions 45 extends from the second cylinder wall 41. The first set of protrusions 43 projects radially-outwardly from the first cylinder wall 39, and the second set of protrusions 45 projects radially-inwardly from the second cylinder wall 41. The first set of protrusions 43 includes a multitude of individual protrusions 43 that are spaced circumferentially apart from one another with circumferentially-spanning clearances therebetween for axially-directed flow of coolant. Similarly, the second set of protrusions 45 includes a multitude of individual protrusions 45 that are spaced circumferentially apart from one another with circumferentially-spanning clearances therebetween for axially-directed flow of coolant. In assembly and mounting, the first and second sets of protrusions 43, 45 come into abutment with one another and individual protrusions 43, 45 are engaging against each other. The respective axial clearances are in alignment upon assembly and mounting and together define axial passages 47 for upward-axial flow of coolant thereat. Multiple seals 49 in the form of o-rings can be situated and seated at an interface between the first and second cylinder walls 39, 41 axially opposite the first and second sets of protrusions 43, 45. With particular reference now to FIG. 10, an intake valve 40, an intake spring 42, and an intake rocker arm 44 work together to prompt introduction of air into the combustion chamber 30 amid use of the radial engine 16. In a similar fashion, an exhaust valve 46, an exhaust spring 48, and an exhaust rocker arm 50 work together to prompt expulsion of exhaust from the combustion chamber 30 amid use of the radial engine 16.

The overhead camshaft assemblies 12 serve to effect opening and closing actuation actions of the intake and exhaust valves 40, 46. An individual overhead camshaft assembly 12 constitutes a single overhead camshaft arrangement, and one overhead camshaft assembly 12 installation is situated at each piston/cylinder of the radial engine 16-there are nine overhead camshaft assemblies 12 in total in the embodiment of the figures to correspond to the nine pistons 18 and cylinders 20. Rotational drive input for each overhead camshaft assembly 12 is received from the crankshaft 22 and crankshaft gear 23, and rotational drive output from each overhead camshaft assembly 12 is delivered to the intake and exhaust rocker arms 44, 50. For the sake of brevity, a single overhead camshaft assembly 12 is subsequently described; in this embodiment at least, the nine overhead camshaft assemblies 12 each exhibit the same design and construction and components with respect to one another.

The overhead camshaft assembly 12 can have various designs, constructions, and components in different embodiments depending upon—among other possible factors—the arrangement of downstream and upstream components in terms of input and output to and from the overhead camshaft assembly 12. In the embodiment presented by the figures, and with general reference to FIGS. 4-11 and 13, the overhead camshaft assembly 12 includes an assemblage of gears (or gearset assembly) that receive rotational drive and torque input from the crankshaft 22 and that deliver rotational drive and torque output to the intake and exhaust rockers arms 44, 50. The assemblage of gears can have various designs, constructions, and components in various embodiments. The overhead camshaft assembly 12, per this embodiment, includes a drive gear 53, a first working gear 55, a sprocket 54, a main shaft 56, a second working gear 57, a camshaft sprocket 58, one or more timing drive chains 60, and a camshaft 62. Still, the overhead camshaft assembly 12 could have more, less, and/or different components in other embodiments.

With general reference to FIGS. 4-9, 11, and 13, the drive gear 53 is mounted on the main shaft 56. A set of external gear teeth of the drive gear 53 is directly engaged by and meshes with a set of external gear teeth of the crankshaft gear 23. The crankshaft gear 23 hence drives rotation of the drive gear 53, which in turn incites rotation of the main shaft 56. The sprocket 54 is mounted on the main shaft 56 at an axially-offset position relative to the drive gear 53. Similarly, the first working gear 55 is mounted on the main shaft 56 at an axially-offset position relative to the drive gear 53, as well as relative to the sprocket 54, and is axially sandwiched therebetween. The main shaft 56 hence constitutes a common shaft for the drive gear 53, sprocket 54, and first working gear 55. Due to their mounting, the sprocket 54 and first working gear 55 rotate with the main shaft 56 and as the main shaft 56 is incited to rotate by the drive gear 53. A set of external gear teeth of the sprocket 54 directly engages and meshes with the timing drive chain 60. The sprocket 54 hence drives movement of the timing drive chain 60.

Figure 6:
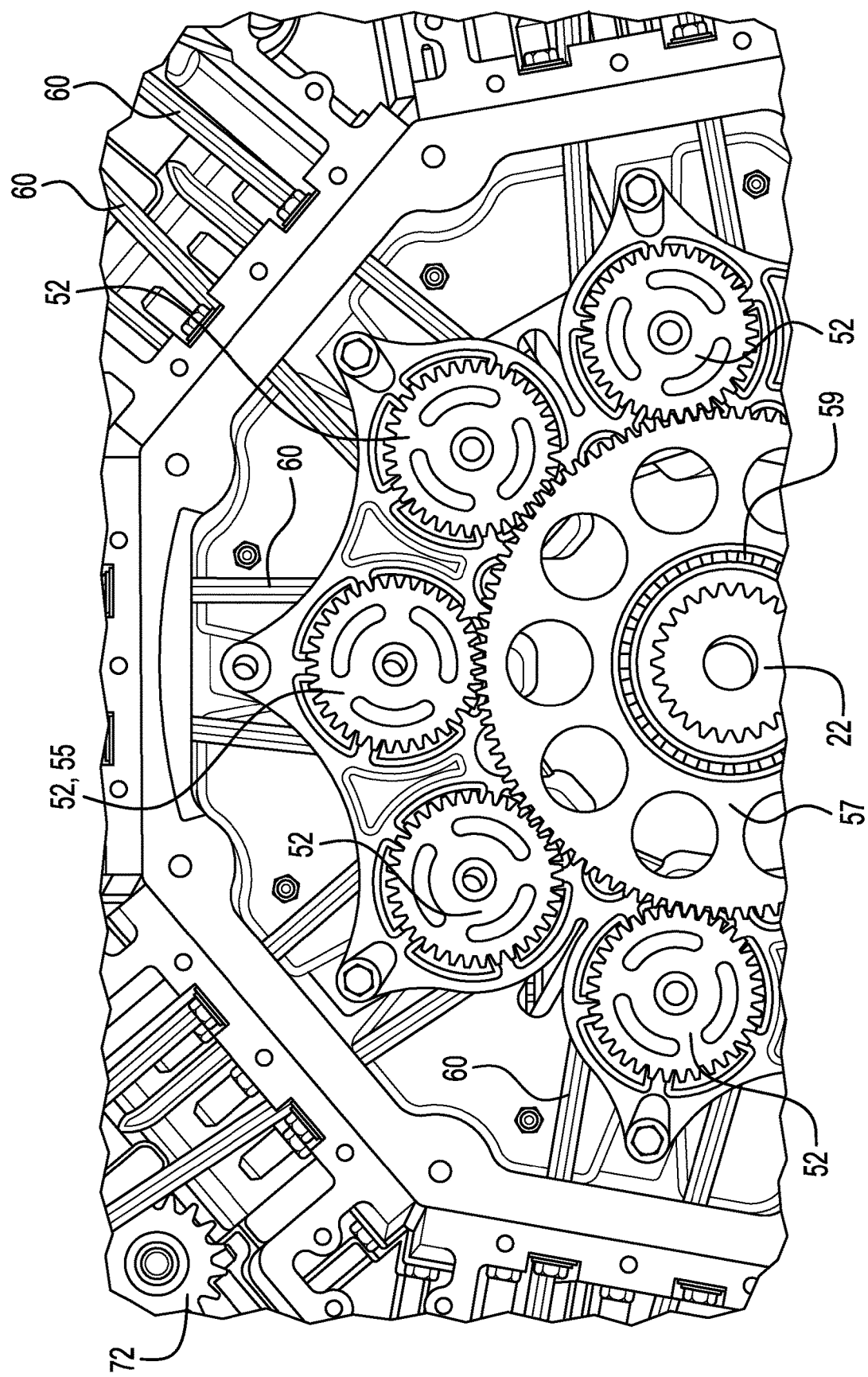
FIG. 6 is a segmented view of an assemblage of gears that can be employed with the overhead camshaft assemblies.
Figure 7:
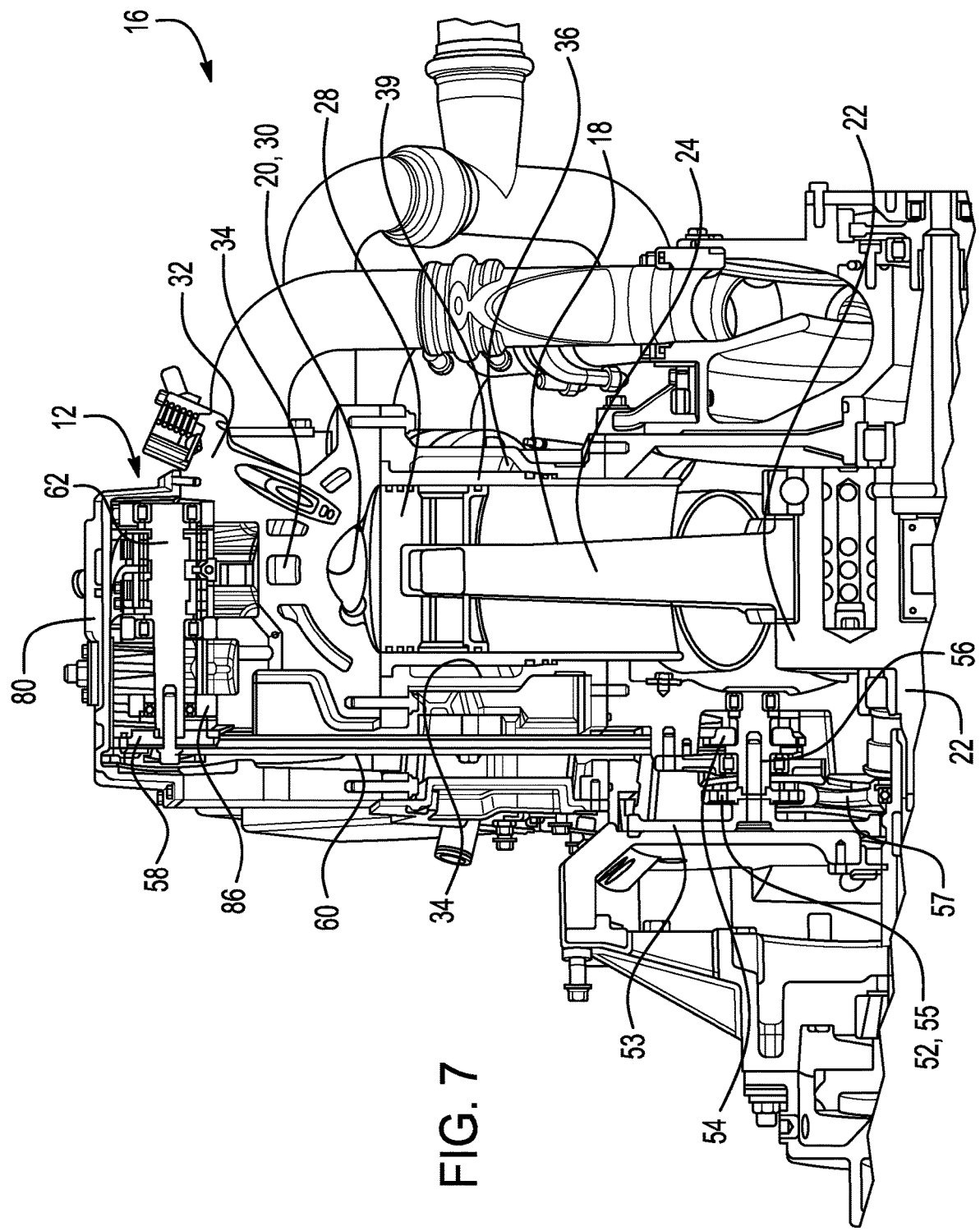
FIG. 7 is a perspective sectional view of one of the overhead camshaft assemblies.
Figure 8:
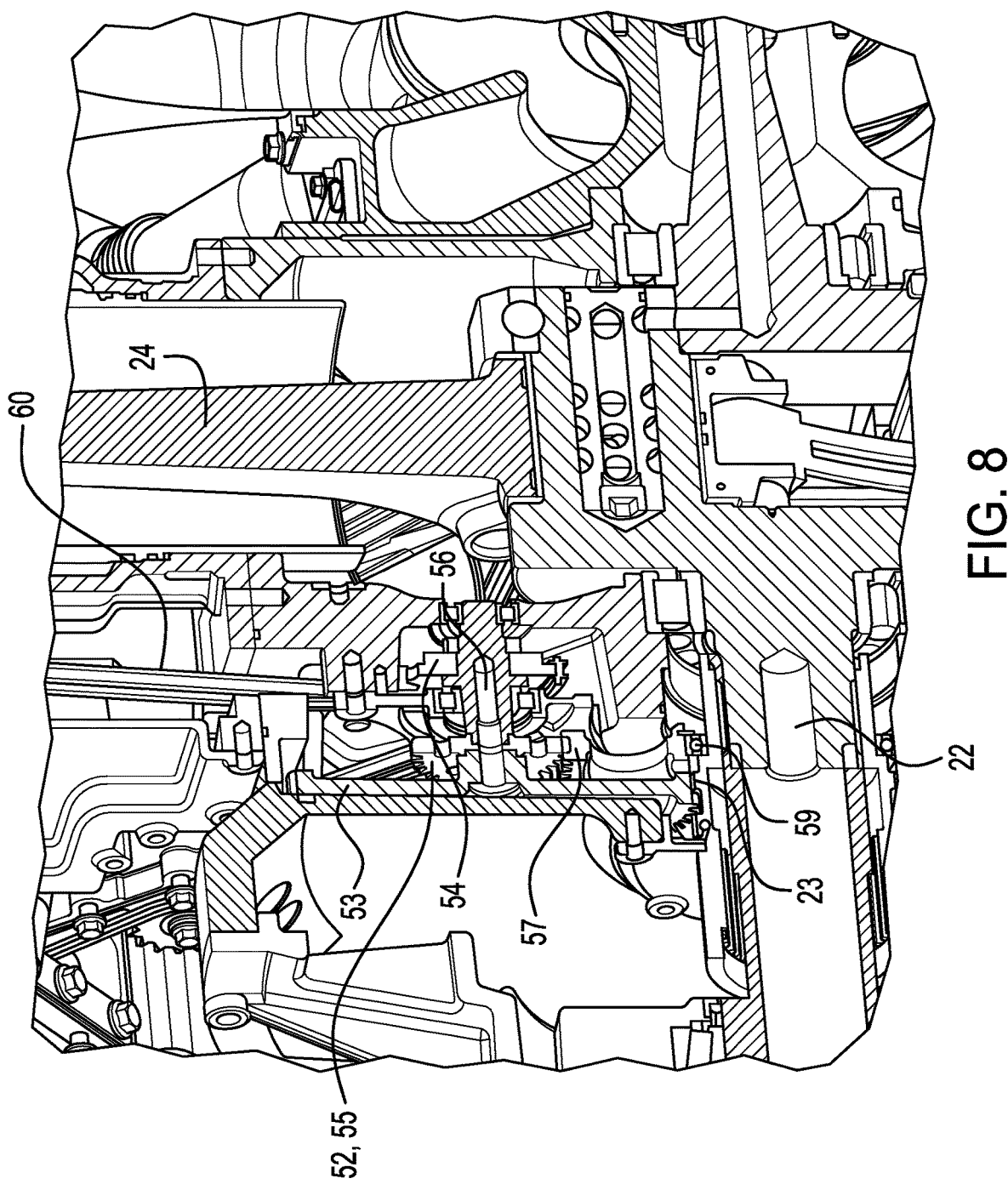
FIG. 8 is an enlarged sectional view of the overhead camshaft assembly.

The first working gear 55 is one gear amongst a set of other gears 52 that are circumferentially arranged around the second working gear 57. The other gears 52, like the first working gear 55, are mounted on respective main shafts 56. But unlike the first working gear 55, the other gears 52 incite rotation of their respective main shafts 56. With particular reference to FIGS. 6 and 8, the first working gear 55 has its set of external gear teeth directly engaged and meshed with a set of external gear teeth of the second working gear 57. The first working gear 55 hence drives rotation of the second working gear 57. The second working gear 57 has a mounting at the crankshaft 22 via a set of working bearings 59, and is hence not driven to rotate by the crankshaft 22 and instead can spin freely thereabout. Rotation of the second working gear 57 is driven solely by the first working gear 55. The second working gear 57 has its set of external gear teeth directly engaged and meshed with a set of external gear teeth of the other gears 52 of other overhead camshaft assemblies 12 of the radial engine 16. The second working gear 57 hence drives rotation of the other gears 52, excluding the first working gear 55. The first working gear 55 can largely or wholly replicate the other gears 52 in terms of shape and dimensions. The other gears 52, in turn, incite rotation of their respective main shafts 56, which causes rotation of their respective sprockets 54 that are also mounted on the respective main shafts 56. In this way, rotation and torque is transferred from the single drive gear 53, to the first working gear 55, to the second working gear 57, and to the other gears 52. Moreover, certain gears of the assemblage can constitute a section or more of a planetary gear set; for instance, the second working gear 57 can constitute a sun gear, while the other gears 52 can constitute the accompanying planet gears.

It has been shown that this embodiment of the assemblage of gears more readily facilitates torque transfer and rotational drive output from the crankshaft gear 23 and, ultimately, to the sprockets 54 and camshaft sprockets 58 in an efficient and effective manner, while minimizing friction generation among contact surfaces of the assemblage of gears. This has been found to beneficially minimize the required use and demands of bearings in the assemblage.

The camshaft sprocket 58 is mounted on the camshaft 62, and drives rotation of the camshaft 62. A set of camshaft external gear teeth of the camshaft sprocket 58 is directly engaged by and mesh with the timing drive chain 60. The timing drive chain 60 hence drives rotation of the camshaft sprocket 58. The timing drive chain 60 is an endless loop engaged around and spanning between the sprocket 54 and the camshaft sprocket 58. The timing drive chain 60 can be composed of a metal material. In the embodiment here, there is a single timing drive chain 60 to transfer rotational drive, but in other embodiments there could be other quantities, including dual or more timing drive chains 60. To draw the timing drive chain 60 taut and tight, and maintain tautness and tightness, a tensioner assembly 70 (FIG. 5) is furnished along the extent of the timing drive chain 60. The tensioner assembly 70 includes an idler gear 72 that is spring-biased against the timing drive chain 60.

The camshaft 62 physically interacts with the intake rocker arm 44 and the exhaust rocker arm 50 in order to cause opening and closing actuation actions of the intake valve 40 and the exhaust valve 46. With specific reference to FIG. 9, the camshaft 62 has an elongated extent that spans longitudinally from a first end 76 adjacent the camshaft sprocket 58 to a second end 78 adjacent the installation of the intake and exhaust rocker arms 44, 50. The camshaft 62 is located outboard of the combustion chamber 30. An outboard housing 80 encloses the camshaft 62. The camshaft 62 has an intake lobe 82 and an exhaust lobe 84. The outboard housing 80 can be made-up of multiple walls. The intake and exhaust lobes 82, 84 are axially offset relative to each other. The intake and exhaust lobes 82, 84 are radial-outward protrusions that come into respective abutment with the intake rocker arm 44 and the exhaust rocker arm 50 at alternate times amid use of the overhead camshaft assembly 12.

Furthermore, in order to support and carry certain components of the overhead camshaft assemblies 12, a multitude of camshaft carrier assemblies 86 (also referred to as valvetrain carrier assemblies) are situated outboard of the cylinder heads 32. A single camshaft carrier assembly 86 is mounted to each of the cylinder heads 32. The mounting can be via bolting. The camshaft carrier assemblies 86 are separate and distinct components with respect to the cylinder heads 32. The camshaft carrier assemblies 86, in general, have proven to facilitate packaging of components of the overhead camshaft assemblies 12 and arrangement thereof, and facilitate installation of the overhead camshaft assemblies 12 to the cylinder heads 32. The camshaft carrier assemblies 86 support mounting of certain components of the overhead camshaft assemblies 12 thereto. The camshaft carrier assemblies 86 can have various designs, constructions, and components in various embodiments depending at least in part upon the design and construction and components of the overhead camshaft assemblies subject to support.

Figure 9:
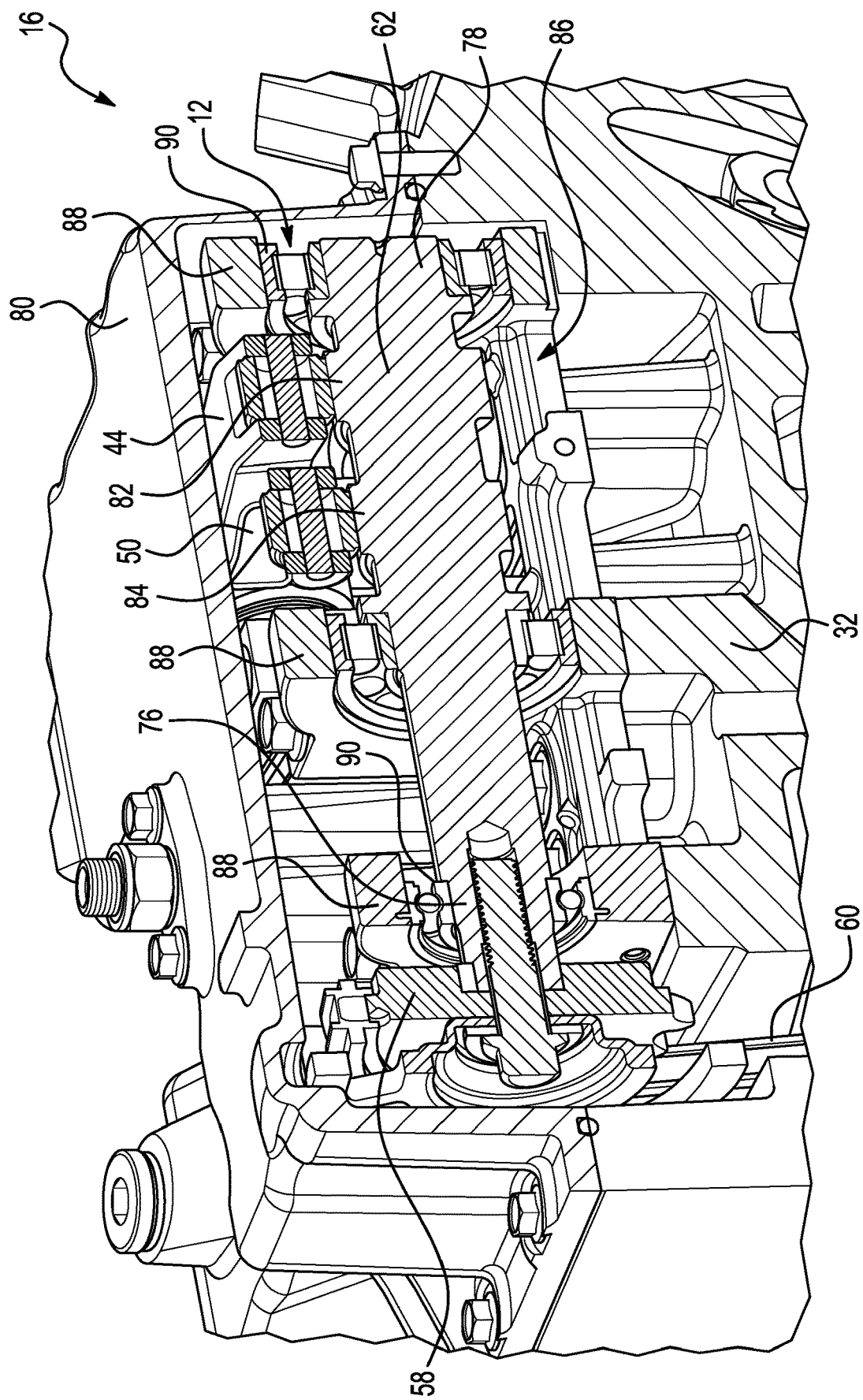
FIG. 9 is an enlarged sectional view of the overhead camshaft assembly.
Figure 11:
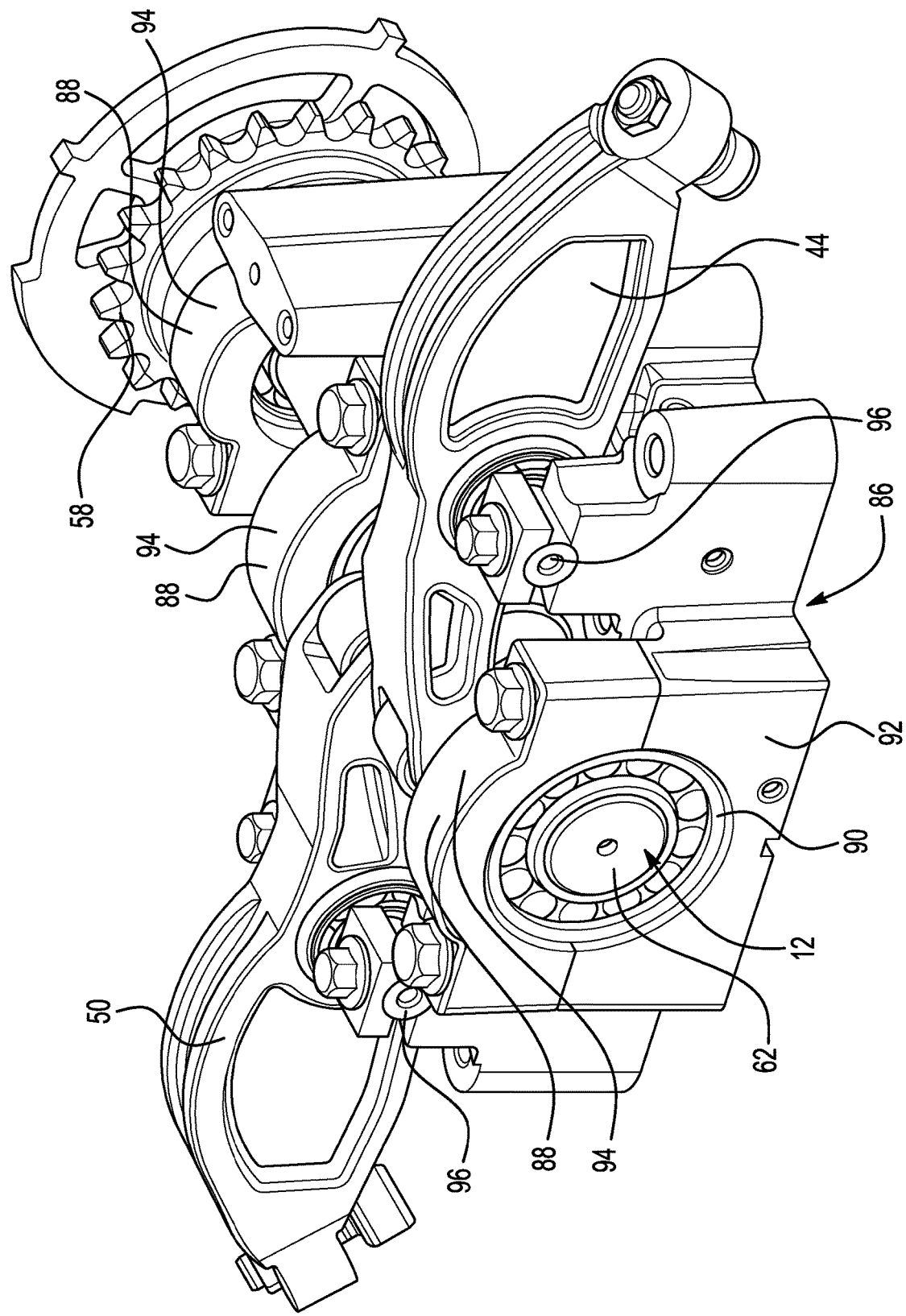
FIG. 11 is a perspective view of an embodiment of a camshaft carrier assembly of the radial engine.
Figure 12:
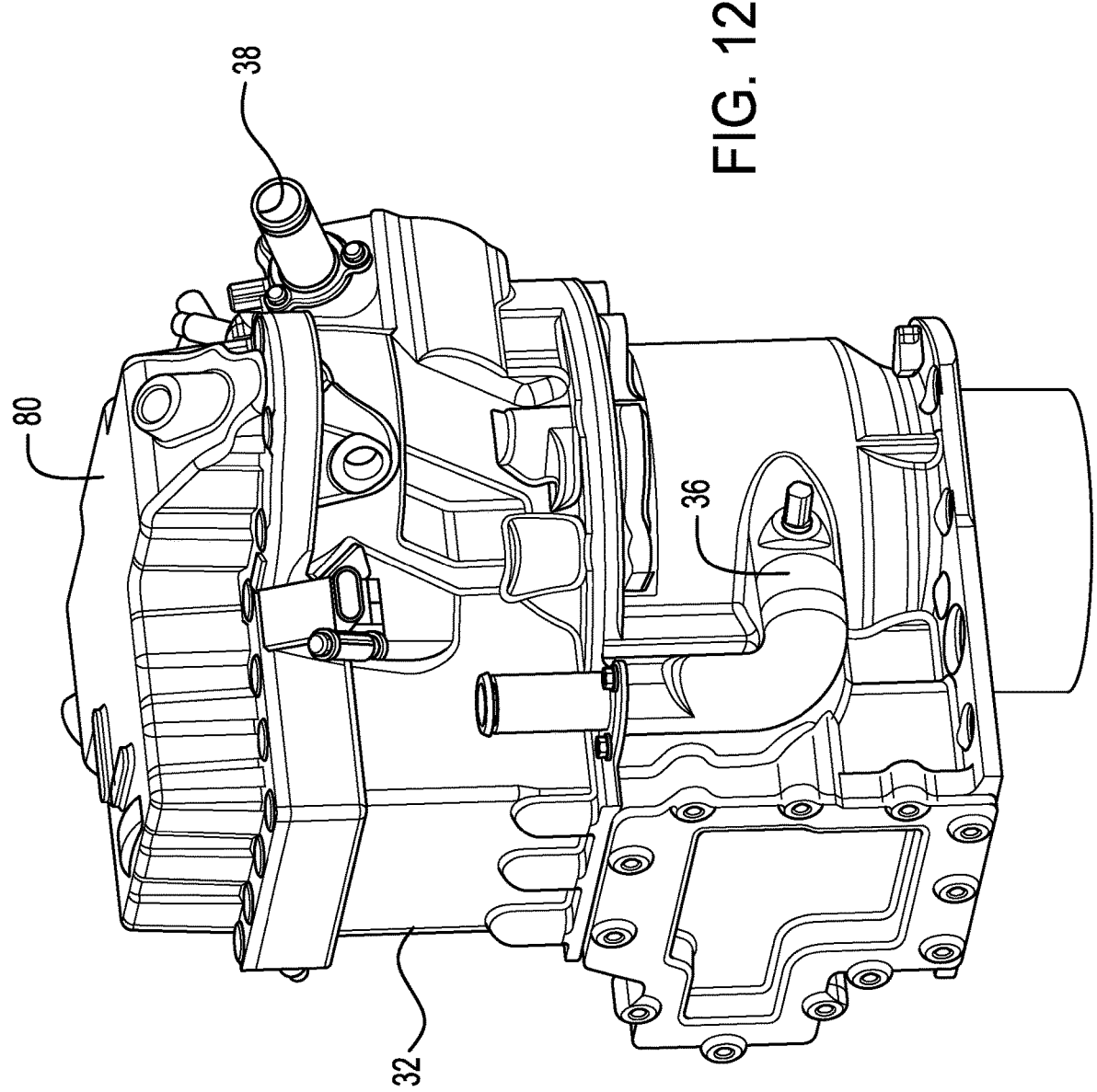
FIG. 12 is a perspective view of an upper portion of an isolated piston and cylinder construction of the radial engine.
Figure 13:
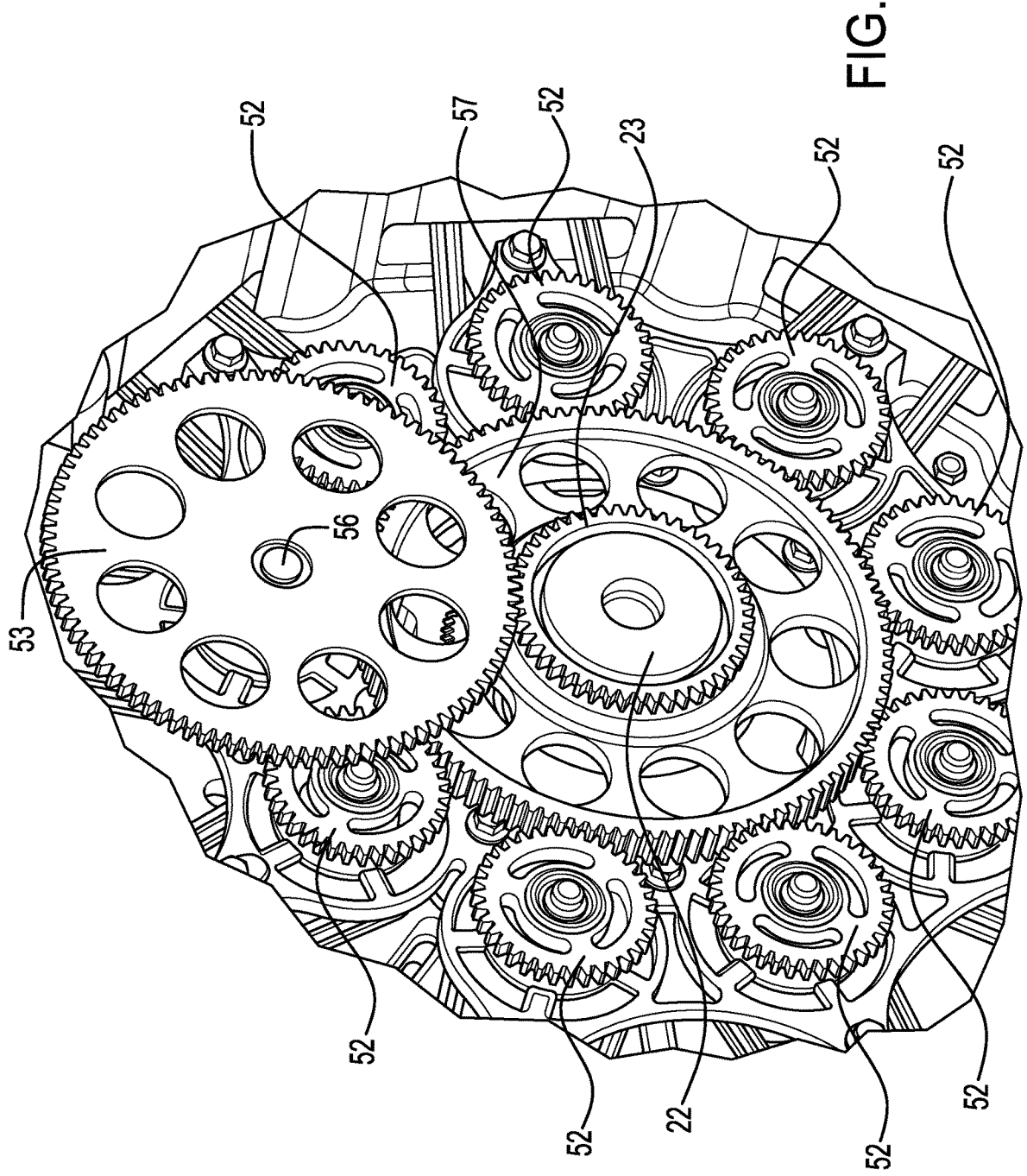
FIG. 13 is a perspective view of the assemblage of gears that can be employed with the overhead camshaft assemblies.

In the embodiment presented in the figures, and with reference to FIGS. 9 and 11, an individual camshaft carrier assembly 86 includes a multitude of segmented plates 88, or structural walls. Carrier bearing assemblies 90 are held in the segmented plates 88 and engage the camshaft 62 to support rotation thereof. The camshaft 62 and bearing assemblies 90 are seated in a lower carrier portion 92 of the camshaft carrier assembly 86, with upper carrier portions 94 bolted thereto to secure placement of the camshaft 62 and carrier bearing assemblies 90. The lower carrier portion 92 can be bolted directly to a respective cylinder head 32. The camshaft carrier assembly 86 and its segmented plates 88 carry and support placement and securement of the camshaft 62. Further, the camshaft carrier assembly 86 carries and supports placement and securement of the intake rocker arm 44 and the exhaust rocker arm 50 in assembly and installation. Pivot shafts 96 of the intake and exhaust rocker arms 44, 50 are mounted at the camshaft carrier assembly 86.

It is to be understood that the foregoing is a description of one or more aspects of the disclosure. The disclosure is not limited to the particular embodiment(s) disclosed herein, but rather is defined solely by the claims below. Furthermore, the statements contained in the foregoing description relate to particular embodiments and are not to be construed as limitations on the scope of the disclosure or on the definition of terms used in the claims, except where a term or phrase is expressly defined above. Various other embodiments and various changes and modifications to the disclosed embodiment(s) will become apparent to those skilled in the art. All such other embodiments, changes, and modifications are intended to come within the scope of the appended claims.

As used in this specification and claims, the terms "e.g.," "for example," "for instance," "such as," and "like," and the verbs "comprising," "having," "including," and their other verb forms, when used in conjunction with a listing of one or more components or other items, are each to be construed as open-ended, meaning that the listing is not to be considered as excluding other, additional components or items. Other terms are to be construed using their broadest reasonable meaning unless they are used in a context that requires a different interpretation.

The invention claimed is:

1. A radial engine-generator, comprising:
an electric power generator;
a radial engine coupled to said electric power generator, said radial engine including a plurality of cylinders arrayed about a crankshaft, each cylinder comprising:
a cylinder head arranged on a radially outer end of said cylinder with respect to said crankshaft;
a camshaft carrier assembly mounted on said cylinder head; and
an overhead camshaft assembly mounted on said camshaft carrier assembly, said overhead camshaft assembly including at least one camshaft with a camshaft sprocket receiving rotational drive input from a sprocket via at least one timing drive chain, said sprocket operatively connected to a gearset assembly of said radial engine,
wherein said gearset assembly includes:
a crankshaft gear fixed to said crankshaft,
a drive gear driven via said crankshaft gear, and
a plurality of gears respectively coupled to said sprocket of each cylinder so as to provide each sprocket with said rotational drive input, and one gear of said plurality of gears is a first working gear further coupled to said drive gear via a main shaft.

2. The radial engine-generator as set forth in claim 1, wherein in each overhead camshaft assembly, said at least one camshaft includes an intake lobe and an exhaust lobe.

3. The radial engine-generator as set forth in claim 1, wherein said gearset assembly further includes a second working gear engaged with said plurality of gears such that said first working gear drives a remaining portion of said plurality of gears via said second working gear.

4. The radial engine-generator as set forth in claim 3, wherein said second working gear is mounted to said crankshaft via a set of working bearings.

5. The radial engine-generator as set forth in claim 1, wherein each cylinder further comprises a fluid coolant passage at least partially encircling said cylinder between a first cylinder wall and a second cylinder wall.

6. The radial engine-generator as set forth in claim 5, wherein in each cylinder, said first cylinder wall includes a first set of protrusions projecting radially-outwardly, and said second cylinder wall includes a second set of protrusions projecting radially-inwardly, said first set of protrusions configured to respectively engage said second set of protrusions so as to define a set of axial coolant flow passages.

7. The radial engine-generator as set forth in claim 1, wherein in each cylinder, said camshaft carrier assembly includes a plurality of segmented plates mounted on said cylinder head, said plurality of segmented plates carrying said at least one camshaft.

8. The radial engine-generator as set forth in claim 1, wherein each overhead camshaft assembly further includes an intake rocker arm and an exhaust rocker arm.

9. A radial engine-generator, comprising:
an electric power generator;
a radial engine coupled to said electric power generator, said radial engine including a plurality of cylinders arrayed about a crankshaft, each cylinder comprising:
a cylinder head arranged on a radially outer end of said cylinder with respect to said crankshaft;
a camshaft carrier assembly mounted on said cylinder head; and
an overhead camshaft assembly mounted on said camshaft carrier assembly, said overhead camshaft assembly including:
an intake rocker arm,
an exhaust rocker arm, and
at least one camshaft with a camshaft sprocket receiving rotational drive input from a sprocket via at least one timing drive chain, said sprocket operatively connected to a gearset assembly of said radial engine,
wherein said gearset assembly includes:
a crankshaft gear fixed to said crankshaft,
a drive gear driven via said crankshaft gear, and a plurality of gears respectively coupled to said sprocket of each cylinder so as to provide each sprocket with said rotational drive input, and one gear of said plurality of gears is a first working gear further coupled to said drive gear via a main shaft.

10. The engine-generator radial engine as set forth in claim 9, wherein said gearset assembly further includes a second working gear engaged with said plurality of gears such that said first working gear drives a remaining portion of said plurality of gears via said second working gear.

11. The engine-generator radial engine as set forth in claim 10, wherein said second working gear is mounted to said crankshaft via a set of working bearings.

12. The engine-generator radial engine as set forth in claim 9, wherein each cylinder further comprises a fluid coolant passage at least partially encircling said cylinder between a first cylinder wall and a second cylinder wall.

13. The engine-generator radial engine as set forth in claim 12, wherein in each cylinder, said first cylinder wall includes a first set of protrusions projecting radially-outwardly, and said second cylinder wall includes a second set of protrusions projecting radially-inwardly, said first set of protrusions configured to respectively engage said second set of protrusions so as to define a set of axial coolant flow passages.

14. The engine-generator radial engine as set forth in claim 9, wherein in each cylinder, said camshaft carrier assembly includes a plurality of segmented plates mounted on said cylinder head.

15. A radial engine-generator, comprising:
an electric power generator;
a radial engine coupled to said electric power generator, said radial engine including a plurality of cylinders arrayed about a crankshaft, each cylinder comprising:
a fluid coolant passage at least partially encircling said cylinder;
a cylinder head arranged on a radially outer end of said cylinder with respect to said crankshaft;
a camshaft carrier assembly mounted on said cylinder head; and
an overhead camshaft assembly mounted on said camshaft carrier assembly, said overhead camshaft assembly including:
an intake rocker arm,
an exhaust rocker arm, and
at least one camshaft with a camshaft sprocket receiving rotational drive input from a sprocket via at least one timing drive chain, said sprocket operatively connected to a gearset assembly of said radial engine,
wherein said gearset assembly includes:
a crankshaft gear fixed to said crankshaft,
a drive gear driven via said crankshaft gear,
a plurality of gears respectively coupled to said sprocket of each cylinder so as to provide each sprocket with said rotational drive input, and one gear of said plurality of gears is a first working gear further coupled to said drive gear via a main shaft, and
a second working gear engaged with said plurality of gears such that said first working gear drives a remaining portion of said plurality of gears via said second working gear.

16. The engine-generator radial engine as set forth in claim 15, wherein in each cylinder, said fluid coolant passage is defined between a first cylinder wall and a second cylinder wall.

17. The engine-generator radial engine as set forth in claim 15, wherein in each cylinder, said camshaft carrier assembly includes a plurality of segmented plates mounted on said cylinder head.

* * * * *